(12) United States Patent
Real

(10) Patent No.: US 7,024,546 B2
(45) Date of Patent: Apr. 4, 2006

(54) AUTOMATICALLY ENABLING EDITING LANGUAGES OF A SOFTWARE PROGRAM

(75) Inventor: Jose Luis Montero Real, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 731 days.

(21) Appl. No.: 09/824,954

(22) Filed: Apr. 3, 2001

(65) Prior Publication Data

US 2002/0144105 A1   Oct. 3, 2002

(51) Int. Cl.
*G06F 9/00* (2006.01)
*G06F 17/20* (2006.01)

(52) U.S. Cl. .................. 713/1; 715/703; 704/8
(58) Field of Classification Search ............... 713/1
See application file for complete search history.

(56) References Cited

U.S. PATENT DOCUMENTS

| | | | | |
|---|---|---|---|---|
| 4,731,735 A | * | 3/1988 | Borgendale et al. ........... 707/4 |
| 4,858,114 A | * | 8/1989 | Heath et al. ................... 703/27 |
| 5,428,772 A | * | 6/1995 | Merz ............................ 707/4 |
| 5,551,038 A | * | 8/1996 | Martin ........................ 713/100 |
| 5,835,768 A | * | 11/1998 | Miller et al. ................. 719/320 |
| 6,014,616 A | * | 1/2000 | Kim .............................. 704/8 |
| 6,340,937 B1 | * | 1/2002 | Stepita-Klauco ............. 341/23 |
| 6,396,515 B1 | * | 5/2002 | Hetherington et al. ....... 345/762 |
| 6,697,089 B1 | * | 2/2004 | Bryan ........................ 715/747 |

OTHER PUBLICATIONS

*Multilanguage Interoperability in Distributed Systems*; Mary J. Maybee, Dennis M. Heimbigner and Leon J. Osterweil; *Proceedings of the 18th International Conference on Software Engineering*; 1996; p. 451-463.

*Multilanguage Design of Heterogeneous Systems*; P. Coste, F. Hessel, Ph. Le Marrec, Z. Sugar, M. Romdhani, R. Suescun, N. Zergainoh and A. A. Jarraya; *Proceedings of the Seventh International Workshop on Hardware/Software Codesign*, 1999; pp. 54-48.

* cited by examiner

*Primary Examiner*—Lynne H. Browne
*Assistant Examiner*—Eric Chang
(74) *Attorney, Agent, or Firm*—Merchant & Gould

(57) ABSTRACT

A method for enabling editing languages in an application program module is disclosed. The method begins with a determination when the application program boots whether it is the first boot of the application program module. If so, then the user interface (UI) language, Web locale language, help language and install language of the application program module are set to the same language as the operating system user interface (UI) language. If it is not the first boot (or after the languages are set to the operating system UI language), the input locales and operating system scripts are enabled as the editing languages in the application program module. The editing languages for all installed keyboards, IMEs and AIMEs are enabled. Moreover, while the application program module is running, it is determined whether a language is applied within the application program module and, if so, then that language is enabled for editing.

20 Claims, 2 Drawing Sheets

AUTOMATICALLY ENABLING EDITING LANGUAGES OF A SOFTWARE PROGRAM

TECHNICAL FIELD

The invention generally relates to software program modules, and even more particularly, relates to automatically enabling editing languages of a software program module.

BACKGROUND

When used with a language pack add-on module, the "OFFICE" suite of program modules, manufactured by Microsoft Corporation of Redmond, Wash., have the capability of processing documents in any of a large number of supported languages. However, in order to process documents in a particular language, the proper language settings for that particular language must be enabled. One way to enable language settings is through the "OFFICE language settings" application program module. The "OFFICE language settings" application is effective so long as users are aware of it and its necessity for enabling proper language settings. Once a language is enabled using the "OFFICE language settings" application, additional features, commands and resources become available that make it easy to use the enabled language in "OFFICE" documents.

However, many users do not discover the "OFFICE language settings" application because it is an entirely separate application program module from the "OFFICE" suite of application program modules. For example, a user must go into the "START" menu in a "WINDOWS" operating system to open the "OFFICE language settings". Thus, users often are unaware of the existence of the "OFFICE language settings" application. ("OFFICE", "WORD", "POWERPOINT", "PUBLISHER", "OUTLOOK", "WINDOWS", and "WINDOWS 2000" are trademarks of Microsoft Corporation.)

There is a need for a method and system for automatically enabling editing languages for a software program module.

SUMMARY OF THE INVENTION

The present invention meets the above-described needs by providing a method for enabling editing languages in an application program module. In one embodiment, the method begins with a determination when the application program boots whether it is the first boot of the application program module. If so, then the user interface (UI) language, Web locale language, help language, and install language of the application program module are set to the same language as the operating system user interface (UI) language or the default system locale for operating systems that cannot switch the user interface (UI) language. If it is not the first boot (or after the languages are set to the operating system UI language), the input locales and operating system scripts are enabled as editing languages in the application program module. Moreover, while the application program module is running, it is determined whether a language is applied within the application program module and, if so, then that language is enabled for editing.

That the invention improves over the drawbacks of the prior art and accomplishes the advantages described above will become apparent from the following detailed description of the exemplary embodiments and the appended drawings and claims.

DETAILED DESCRIPTION OF EMBODIMENTS OF THE INVENTION

Figure 1:
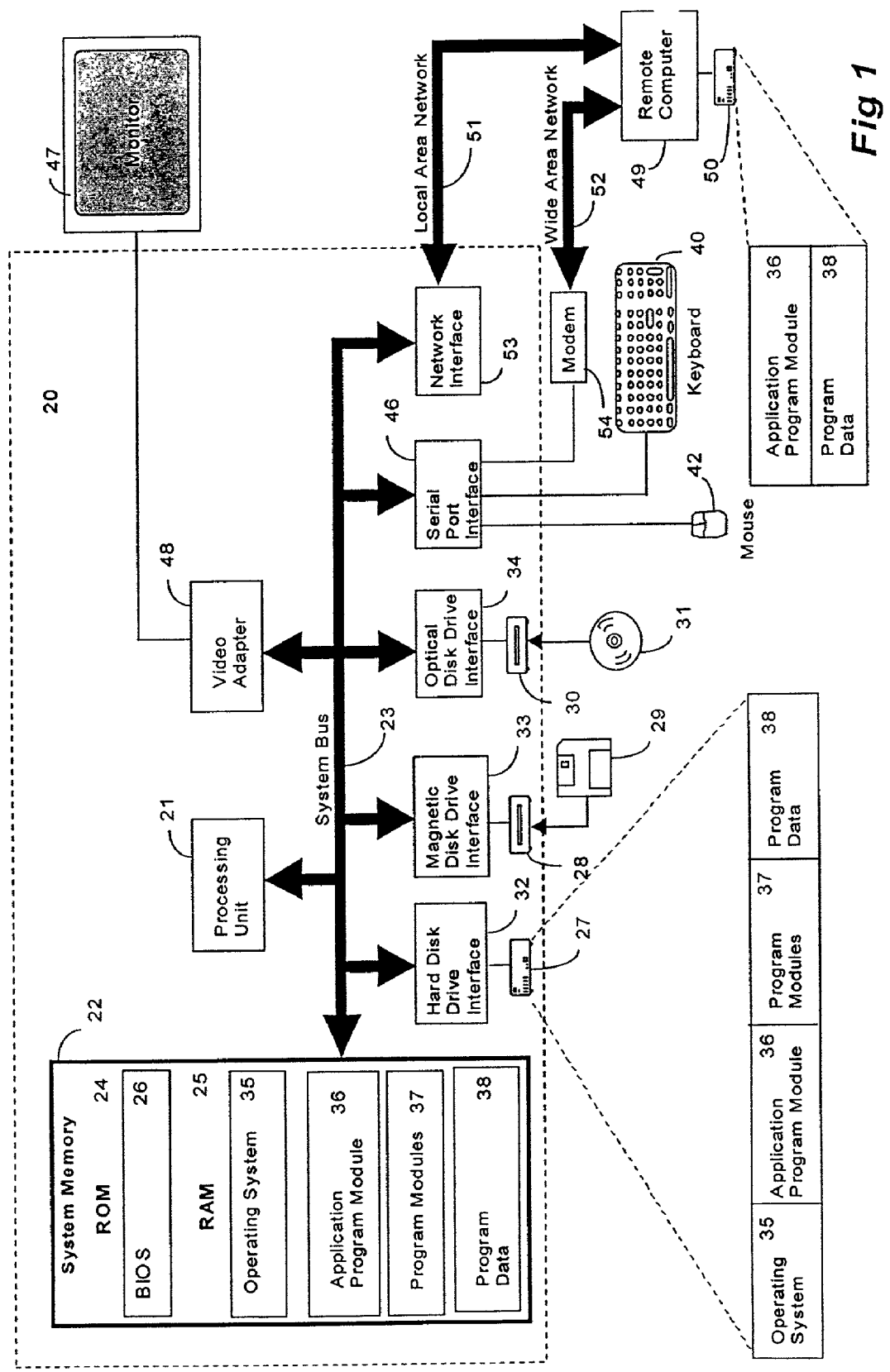
FIG. 1 is a block diagram an exemplary system for implementing the invention.

An embodiment of the present invention will be incorporated into the "OFFICE 2002" suite of application program modules manufactured and distributed by Microsoft Corporation of Redmond, Wash.

In a preferred embodiment of the invention, the application program module (such as the "OFFICE" suite of application program modules) has multiple editing languages, but they are disabled until a registry key for a particular editing language is turned on (exposing the features and functionality of the editing language). A separate application, such as the "OFFICE language settings" application, allows the user to explicitly turn on and off editing languages. However, many times the user is unaware either that the registry key must be enabled or that a separate application needs to be used to enable the registry key. The present invention automatically enables appropriate editing languages so that functionality is automatically available to the user.

In one embodiment, the present invention determines when the application program boots whether it is the first boot of the application program module. Typically, the first boot refers to the first time any "OFFICE" application is launched or run. If it is the first boot, then the user interface (UI) language, Web locale language, help language and install language of the application program module are set to the same language as the operating system user interface (UI) language or the default system locale for operating systems that cannot switch the user interface (UI) language. If it is not the first boot (or after the languages are set to the operating system UI language), the input locales and operating system scripts are also enabled as editing languages in the application program module. Moreover, while the application program module is running, it is determined whether a language is applied within the application program module and, if so, then that language is enabled for editing.

Thus, it should be understood that, in one embodiment, the invention automatically searches for information in the operating system and in the way users use application program modules to obtain hints about which language settings should be enabled. The application program module determines which input locales (keyboards, Input Method Editors (IMEs), etc.) are installed as well as which scripts in the operating system have been installed by the user and turns on all these languages as editing languages in the application program modules. An application program module may also enable any languages that the user applies to any piece of text applied to a document.

Also, application program modules typically base some default settings such as paper size, default speller, dates, times, etc. on the install language so the application program module behaves more like a localized version of the program module. The ultimate result of the present invention is that if you run any language version of "OFFICE" on a particular language of the operating system, "OFFICE" behaves more like the localized version of "OFFICE" for that operating system. For example, installing English "OFFICE" on a Japanese operating system will set the install language to Japanese and the applications will behave like Japanese "OFFICE" which means that the default paper size won't be letter as it is in the United States, but Imperial as in Japan, etc.

Exemplary Operating Environment

FIG. 1 and the following discussion are intended to provide a brief, general description of a suitable computing environment in which the invention may be implemented. Although not required, the invention will be described in the context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28 and optical disk drive 30 are connected to the system bus 23 by a hard disk drive interface 32, a magnetic disk drive interface 33 and an optical drive interface 34, respectively. The drives and their associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36 (such as the "OFFICE" suite of program modules), other program modules 37, and program data 38. The "OFFICE" suite of application program modules may include a "WORD" application program module, a "POWERPOINT" application program module and a "PUBLISHER" application program module, among others.

A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial port (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Editing Languages

In a preferred embodiment of the present invention, the "OFFICE" suite of applications includes registry keys for editing languages. The registry keys for editing languages are used to enable (turn on) language specific functionality. Enabling an editing language turns on language specific features and enables language detection features. For example, turning on Japanese as an editing language may activate specific functionality relevant to the Japanese language. Without tying the language functionality to specific editing languages, all of the functionality related to supported languages would be displayed and might overwhelm the user (especially the user who only edits in a single language).

It should be understood that, in a preferred embodiment of the present invention, the valid states for a registry key of an editing language are ExplicitOn, ExplicitOff, On and Off. The On and Off values for editing languages will be used to indicate that another application besides the "OFFICE language settings" application turned on those languages for editing. Thus, when the present invention turns on or off an editing language then it will be set to "On" or "Off". However, when an editing language is turned on or off using the "OFFICE language settings" application, the editing language is set to "ExplicitOn" or "ExplicitOff".

Automatically Enabling Editing Languages

Figure 2:
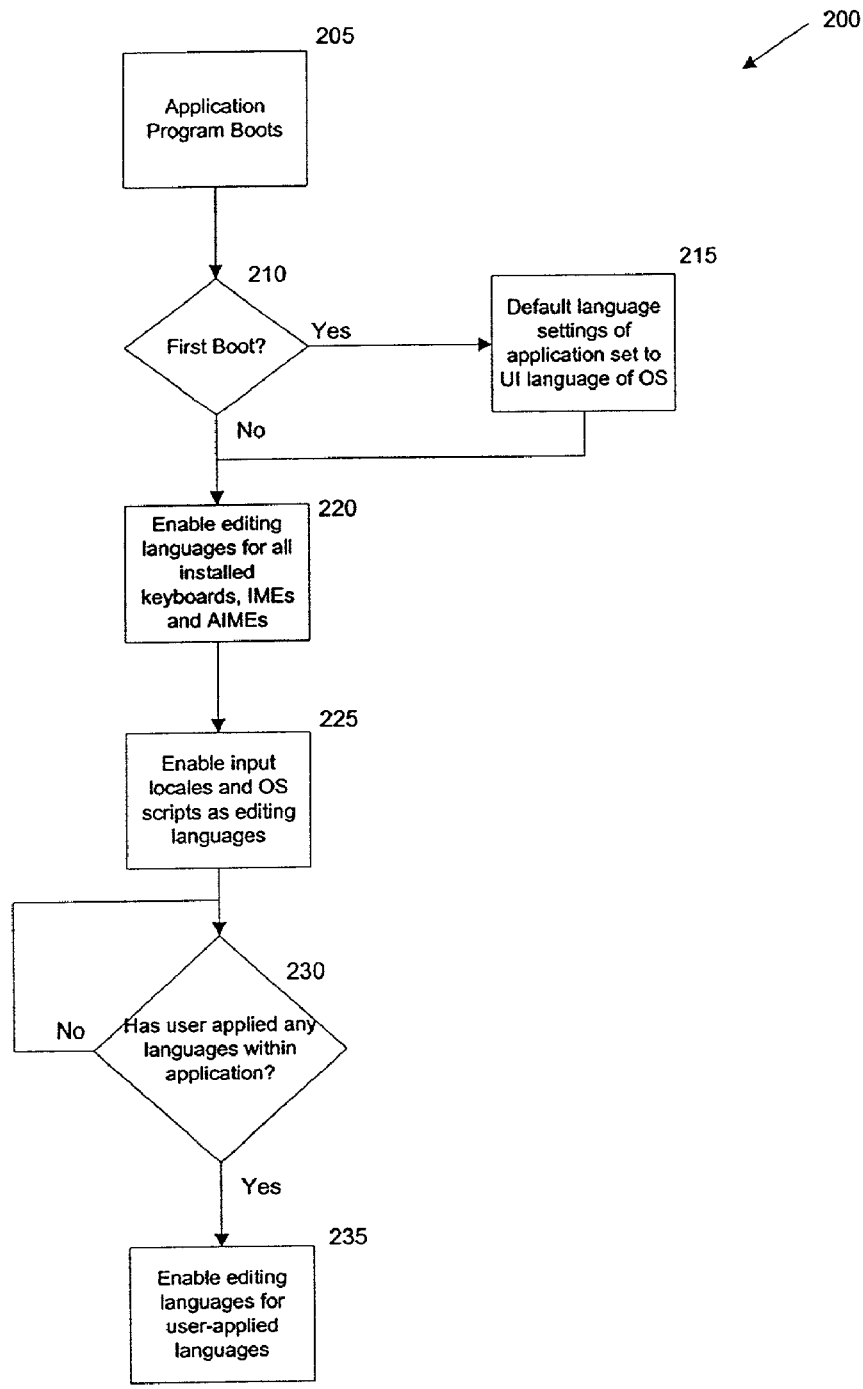
FIG. 2 is a flow diagram illustrating a method for automatically enabling editing languages in an application program module

Referring now to FIG. 2, a flowchart illustrating a method 200 for automatically enabling editing languages in an application program module in accordance with an embodiment of the present invention will be described. The method 200 begins at step 205 when an application program boots. The method then proceeds to decision step 210. At decision step 210, it is determined whether it is the first boot of the application program module and, if so, then the method proceeds to step 215.

At step 215, the default language settings of the application program module are set to the user interface language of the operating system or the default system locale for operating systems that cannot switch the user interface (UI) language. In a preferred embodiment of the invention, the application program module is the "OFFICE" suite of program modules. Thus, at step 215, in the preferred embodiment, the default "OFFICE" language settings (install language, application user interface language, help language and Web locale language) are set to follow the operating system UI language or the default system locale of the operating system. Typically, the install language is the language that sets the defaults for the application program module to behave as a localized version of the application program module. The user interface language is the language of the user interface (menus and dialogs). The help language is the language of help topics and the Web locale language is the language to be used by the applications when redirecting users to a web site.

It should be understood that the system locale is the code page used by the operating system to translate characters for non-Unicode applications (such as "OUTLOOK"). Operating system UI language is the language of the menus and dialogs. In a preferred embodiment, if the application program module is installed over a "WINDOWS 2000" operating system, then the application user interface language, help language and Web locale language should be set to "0" so that the "OFFICE" suite follows the operating system user interface language.

It should be understood that, in a preferred embodiment, at first boot, the "OFFICE" suite enables the Install language, system user interface language and default system locale as an edit language using an editing language value equal to "On" (rather than "ExplicitOn" that can only be written by the "OFFICE language settings" application). This is so because if the customer is using a particular UI, Help or Install language it is sensible that that language be enabled for editing so that those language-specific features are available in the applications.

It should be understood that the idea behind setting the default language (install language, application user interface language, help language and Web locale language) to be the same as the system language of the operating system (OS) is that network administrators typically need to roll out a single version of the application program module that customizes itself to fit the local user needs. If a user is using a particular language operating system, then it's likely that they'll have their applications use the same default settings and language behavior as the operating system. This will reduce the amount of work (commonly referred as total cost of ownership) that network administrators need to do so that each individual gets the default settings in a single roll out of customizations to all users.

Returning now to method 200 (FIG. 2), at step 220, editing languages for all installed keyboards, Input Method Editors (IMEs) and AIMEs are enabled. In a preferred embodiment, to determine whether there is an AIME installed, the "OFFICE" suite may call the MsoFAIMEAvailable function. To check if a regular IME is installed in the system, the "OFFICE" suite may call the MsoTIMEAvailable function. In a preferred embodiment, these editing languages are enabled using an editing language value="On" (rather than "ExplicitOn" that can only be written by the "OFFICE language settings" application). In a preferred embodiment, on every boot, the "OFFICE" suite will detect all the keyboards, IMEs and AIMEs installed in the operating system and will turn on those languages as editing languages by writing a value equal to "On" in the LCID registry key under the HKCU/Software/Microsoft/Office/10.0/Common/LanguageResources branch. If the user later turns off the editing language in the "OFFICE language settings" application, it will write a value equal to "ExplicitOff" in the LCID registry key for that editing language. It should be understood that whenever the present invention determines that an editing language has a value equal to "ExplicitOff", it won't try to turn that value on again.

The method 200 then proceeds to step 225 where input locales and operating system scripts are enabled as editing languages. In a preferred embodiment, when the "OFFICE" suite of applications is installed in the "WINDOWS 2000" operating system, the "OFFICE" suite automatically detects the system-enabled scripts by using the Win2000 EnumSystemLanguageGroups function on each boot. The "OFFICE" suite then turns on for editing the user locale language if it's a flavor of any of the enabled Windows 2000 scripts by writing a value equal to "On" in the LCID registry key under the HKCU/Software/Microsoft/Office/10.0/Common/LanguageResources branch. Flavor refers to the different versions of a language such as English which may have differences in the U.S., the U.K., Canada, Australia, etc. If the user later turns off the editing language in the "OFFICE language settings" application, the "OFFICE language settings" application will write a value equal to "ExplicitOff" in the LCID registry key for that editing language. Whenever the "OFFICE" suite determines that an editing language has a value equal to "ExplicitOff" it won't try to turn that value on again.

It should be understood that some user actions within the application program module reveal information about languages that the user would like to turn on for editing. Thus, at decision step 230, it is determined whether the user has applied any languages within the application program module and, if so, then the method proceeds to step 235. At step 235, the editing language for the applied language(s) is enabled. For example, in a preferred embodiment, whenever a user changes the current language of the insertion point (IP) in either the "WORD" application, the "PUBLISHER" application, or the "POWERPOINT" application, that language is automatically enabled for editing using an editing language value equal to "On". As another example, suppose the user changes the language of the speller dictionary to use, the language of the speller dictionary may be turned on for editing.

From the foregoing description, it should be understood that the present invention solves many different problems found in the prior art. For example, suppose a user is an English "OFFICE" suite customer. Although most of the time the user edits documents in English, from time-to-time he needs to edit text in other languages. The user may have heard of a feature called LAD (Language AutoDetect) but he has not been able to make LAD work. The user is unaware that in order to make LAD work he needs to enable that language for editing. The user has already explicitly spell-checked text in another language but it seems as if the "OFFICE" suite never takes the spell-checked languages into consideration for LAD. In one embodiment of the invention, this problem is solved by the present invention.

As another example, suppose an administrator in a multinational corporation wants to roll out the "OFFICE" suite of applications into several subsidiaries and make a single set of customizations to everyone. In the past, the administrator had to make at least two sets of customizations to make this happen: one set to install the "OFFICE" suite using the correct default language settings and another set of customizations that are shared across all users no matter what language they need. In one embodiment, the present invention uses the existing operating system settings and local settings so that the correct default language settings are set so that a single rollout is achieved by using only a single set of customizations for every user no matter what language they need.

Thus, it should be understood from the foregoing description that, in a preferred embodiment, the application program module automatically sets its language settings based on the existing language settings available from the operating system. The application program module also automatically sets its language settings based on language choices made within the application without having to manually perform them in a separate application.

It should be understood that the foregoing pertains only to the preferred embodiments of the present invention, and that numerous changes may be made to the embodiments described herein without departing from the spirit and scope of the invention.

I claim:

1. A method for booting an application program running over an operating system on a computer, wherein the application program and operating system support a plurality of editing languages, the method comprising the steps of:
    booting the application program;
    in response to the boot, determining whether it is the first boot of the application program, and, if so, then setting a plurality of default language settings of the application program to be equal to a user interface language of the operating system, whereby a subsequent boot of the application program will enable the language settings previously set as the default language settings for the application program; and
    if not the first boot of the application program, then enabling the language settings previously set as default language settings for the application program.

2. The method of claim 1 wherein the plurality of default language settings comprise a user interface language of the application program.

3. The method of claim 1 wherein the plurality of default language settings comprise a help language of the application program.

4. The method of claim 1 wherein the plurality of default language settings comprise a Web locale language of the application program.

5. The method of claim 1 wherein the plurality of default language settings comprise an install language of the application program.

6. The method of claim 1 wherein the plurality of default language settings comprise an install language of the application program, a Web locale language of the application program, a help language of the application program and a user interface language of the application program.

7. The method of claim 6 further comprising the step of enabling an input locale as an editing language for the application program.

8. The method of claim 7 further comprising the step of enabling an operating system script as an editing language for the application program.

9. The method of claim 8 further comprising the step of enabling a language of an installed keyboard as an editing language.

10. The method of claim 9 further comprising the step of enabling a language of an Input Method Editor (IME) as an editing language.

11. The method of claim 1, wherein the default language settings of the application program are set equal to the user interface language of the operating system, in response to determining a first boot, only if registry key values for the language settings of the application program are currently at a value equal to "Off" instead of "ExplicitOff".

12. A method for booting an application program running over an operating system on a computer, wherein the application program and operating system support a plurality of editing languages, the method comprising the steps of:
    booting the application program;
    determining whether it is the first boot of the application program module, and, if so, then setting a plurality of default language settings of the application program to be equal to a default system locale of the operating system;
    enabling at least one editing language for a plurality of keyboards and Input Method Editors (IMEs) installed on the computer;
    enabling at least one editing language for an input locale of the operating system; and
    enabling at least one editing language for an operating system script.

13. The method of claim 12 wherein the input locale comprises software that allows text to be input.

14. The method of claim 13 wherein the input locale is a keyboard layout.

15. The method of claim 12 wherein the operating system script comprises a set of files that enable support in the operating system for that language.

16. The method of claim 12 further comprising the steps of:
    determining whether a language has been applied within the application program and, if so, then enabling an editing language associated with the applied language.

17. The method of claim 16 wherein the step of determining whether a language has been applied within the application program comprises determining whether a language associated with an insertion point within the application program is a language that has not been enabled.

18. The method of claim 12 wherein the steps of enabling are performed by adjusting the value of a plurality of registry keys associated with the plurality of editing languages.

19. The method of claim 18, wherein the step of adjusting the value of the registry keys associated with the plurality of editing languages is performed only if the registry key values are currently at a value equal to "Off" instead of "ExplicitOff".

20. A computer-readable medium comprising computer-readable instructions for performing the steps of claim 12.

* * * * *